A. M. HALL.
Potato Digger.
No. 83,847. Patented Nov. 10, 1868.
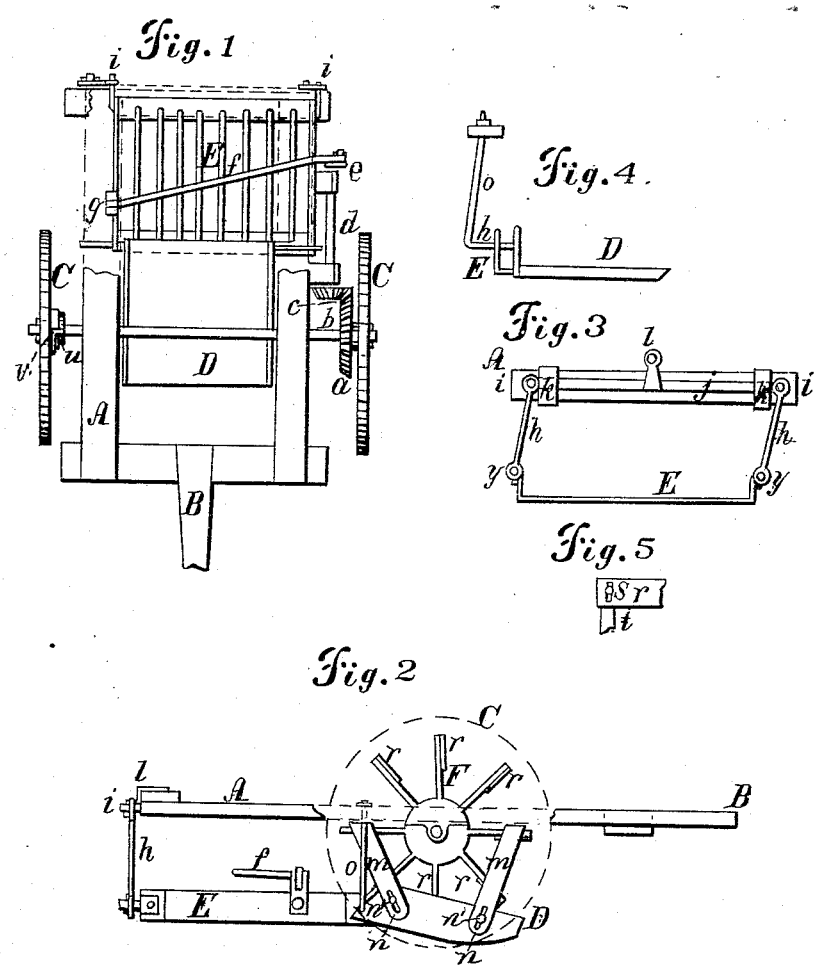

ANDREW M. HALL, OF FALMOUTH, MAINE.

Letters Patent No. 83,847, dated November 10, 1868.

IMPROVEMENT IN POTATO-DIGGERS.

The Schedule referred to in these Letters Patent and making part of the same.

*To all whom it may concern:*

Be it known that I, ANDREW M. HALL, of Falmouth, in the county of Cumberland, and State of Maine, have invented a new and useful Improved Potato-Digger; and I hereby declare the following to be a full, clear, and exact description thereof, which will enable others to make and use my invention, reference being had to the accompanying drawings, forming part of this specification, in which—

Figure 1 is a top view of my invention, with a portion of the frame of the machine broken out, and with the fan omitted.

Figure 2, a side sectional elevation, with parts broken out.

Figure 3 is a back-end view of a part of my machine.

Figure 4, a view of the arms upon which one end of the screener and the digger is suspended.

Figure 5 is a view of the manner of rendering the wings of the fan adjustable.

I am aware of patents heretofore granted on agricultural implements of this kind, and desire to disclaim operating the machine by the motion of the carriage-wheels, and also the digger and vibrating screener.

The object of my invention is to produce a potato-digger which is combined of various devices and parts, as hereinafter set forth, and consists—

First, of a manner of rendering the screener adjustable to greater or less elevations.

Second, in a manner of rendering the carriage easy and convenient to turn.

My invention can be best illustrated by a particular reference to the drawings.

A shows the frame of the carriage.
B, the draught-tongue.
C, the wheels.
D is the digger or plow.
E is the screener.
F, the revolving fan, to carry up the scooped-up earth and vegetables on to the screener.

The general operation of the machine is as follows:

As the carriage is drawn along the field, the bevel-gear $a$, rigidly attached to the carriage-shaft $b$, turns the bevel-gear $c$, rigidly attached to the shaft $d$, which is at a right angle to the carriage-shaft.

This shaft $d$ has the crank $e$, which, when the shaft is in revolution, imparts a vibratory motion to the diagonal arm $f$. This arm is attached by being loosely pivoted to the side wall of the receiver E, at $g$, and by this means the vibratory motion is communicated to the screener.

At the same time that the carriage-shaft $b$ thus moves the screener through the several steps herein set forth, it also moves the fan F, also rigidly attached to said shaft $b$, and turning with it. This fan turns in the trough of the plow D, and is employed to sweep up along the plow, and over into the receiver, all that the plow takes up. This plow D is simply so hung as to scoop up the hills of potatoes, and take away their contents, with some earth, as the carriage passes along the field.

The screen E is suspended upon swinging arms $h$, fig. 3, pivoted to the rear end of the carriage-frame, at $i$, so that the screen can vibrate laterally, and is put in motion by the diagonal arm $f$.

The pivots $i$ are set in an adjustable plate or strip, $j$, confined in clamps $k$, and it, with the arms $h$ and screener, can be elevated or lowered, as desired, by the hand-piece $l$, moved by a lever, if desired. The screen can be thus lifted when the carriage moves off the field.

The plow D is adjustable by means of four slotted arms, $m$ $m$, with studs $n'$ $n'$, on the sides of the plow. The upper end of the arms is attached to the frame A. The slots are shown at $n$ $n$.

The forward end of the screener is held by arms or rods, $o$. These are bent, at $p$, fig. 4, and the bent part passes through holes in the sieve or screen E, and is attached to the plow D, and thus the forward end of the screen vibrates on these bent parts, $p$, of the arm $o$.

The wings $r$ of the fan are adjustable by means of studs $s$ on the arms $t$, and slots on the fans.

$u$ is a ratchet, rigidly attached to the shaft $b$, with a spring-pawl, $v$, so as to allow the machine to be readily turned when the end of the field is reached, and the user is desirous of returning upon another row of hills.

Instead of being rigidly attached to the frame A, the rod $o$ may be pivoted like $h$, and have a brace-rod running further forward on the frame, so that the operation will be that the forward part of the screener E will vibrate upon pivoted arms $o$, instead of on the bent parts $p$.

What I claim as my invention, and desire to secure by Letters Patent, is—

1. The combination of arms $h$, pivoted at $i$ and $y$, plate $j$, clamps $k$, hand or lever-piece $l$, to adjust the screener E, when desired, support the rear end of it, and still to allow of its vibrating motion, as herein set forth.

2. The bent rods $o$, when used to sustain the screen E, allow of its vibrating motion on the parts $p$, and also to aid in supporting the rear end of the plow D, as herein set forth.

3. The adjustable wings of the rotating fans F, as herein set forth.

4. Moving the fan F, and imparting a vibratory motion to the screen E, simultaneously, by means of the revolving axle $b$, by the devices, and as herein set forth.

ANDREW M. HALL.

Witnesses:
WM. H. CLIFFORD,
WM. FRANK SEAVEY.